US010937075B1

(12) United States Patent
Harris

(10) Patent No.: US 10,937,075 B1
(45) Date of Patent: Mar. 2, 2021

(54) CUSTOMER-SUPPLIER LINKING IN A SOFTWARE-AS-A-SERVICE SYSTEM BASED ON COMMUNITY SUPPLIER INFORMATION

(71) Applicant: Coupa Software Incorporated, San Mateo, CA (US)

(72) Inventor: Scott Harris, Menlo Park, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 241 days.

(21) Appl. No.: 16/274,121

(22) Filed: Feb. 12, 2019

Related U.S. Application Data

(60) Provisional application No. 62/725,556, filed on Aug. 31, 2018.

(51) Int. Cl.
*G06Q 30/06* (2012.01)
*G06Q 99/00* (2006.01)
*G06Q 50/28* (2012.01)

(52) U.S. Cl.
CPC ..... *G06Q 30/0613* (2013.01); *G06Q 30/0619* (2013.01); *G06Q 30/0635* (2013.01);
(Continued)

(58) Field of Classification Search
None
See application file for complete search history.

(56) References Cited

U.S. PATENT DOCUMENTS

| 5,319,542 A * | 6/1994 | King, Jr. ............. G06Q 10/087 |
| | | 705/26.61 |
| 5,694,551 A * | 12/1997 | Doyle ................. G06Q 10/087 |
| | | 705/26.62 |

(Continued)

FOREIGN PATENT DOCUMENTS

| WO | WO-0029923 A2 * | 5/2000 | ............. G06Q 30/06 |
| WO | WO-02069074 A2 * | 9/2002 | ............. G06Q 30/06 |
| WO | WO-2017182982 A1 * | 10/2017 | ........... G06Q 10/067 |

OTHER PUBLICATIONS

Anon., "Collego Introduces Next-Generation Catalog Solution at Gartner Event—Extended Release -", Business Wire, May 7, 2001. (Year: 2001).*

(Continued)

*Primary Examiner* — Nicholas D Rosen
(74) *Attorney, Agent, or Firm* — Baker Botts, L.L.P.

(57) ABSTRACT

Techniques are disclosed for improved linking of customers with suppliers in a software-as-a-service system based on community supplier information. The techniques include the system suggesting to customers holding customer accounts with the system that the customers establish customer-supplier links between private supplier records of the customers and supplier accounts of suppliers. Unconventionally, the system makes the suggestions based on matching private supplier records of the customers with community master supplier records of the suppliers. The system stores the community master supplier records based on private supplier records in the community of customers that are associated together by the system according to their similarity. Once a private supplier record of a record is matched to a community master supplier record for a supplier, the system suggests to the customer that the customer link the matched private supplier record to a supplier account of the supplier.

20 Claims, 7 Drawing Sheets

(52) U.S. Cl.
CPC ......... *G06Q 99/00* (2013.01); *G06Q 30/0605* (2013.01); *G06Q 50/28* (2013.01)

(56) References Cited

U.S. PATENT DOCUMENTS

| | | | |
|---|---|---|---|
| 10,404,644 B2 * | 9/2019 | Yalcinalp | ............... G06F 40/186 |
| 10,445,810 B1 * | 10/2019 | Saad | ................ G06Q 30/0631 |
| 2009/0299907 A1 * | 12/2009 | Cofano | ................ G06Q 30/02 |
| | | | 705/80 |
| 2014/0258032 A1 * | 9/2014 | Psota | ................ G06Q 30/0609 |
| | | | 705/26.35 |
| 2015/0081457 A1 * | 3/2015 | Agnes | ............... G06Q 30/0635 |
| | | | 705/14.73 |
| 2017/0310631 A1 * | 10/2017 | Yalcinalp | ............... G06Q 30/01 |

OTHER PUBLICATIONS

De Paula, M., "Good for Business; Understanding that they are now only as healthy as the communities they serve, banks are using their marketing prowess to help clients sell everything from burgers to bikes", US Banker 120.2: 16. SourceMedia, Inc. (Feb. 1, 2010). (Year: 2010).*

* cited by examiner

CUSTOMER-SUPPLIER LINKING IN A SOFTWARE-AS-A-SERVICE SYSTEM BASED ON COMMUNITY SUPPLIER INFORMATION

PRIORITY CLAIM

This application claims the benefit of U.S. provisional application No. 62/725,556, filed Aug. 31, 2018, the entire contents of which is hereby incorporated by reference as if fully set forth herein.

TECHNICAL FIELD

The present disclosure relates generally to computer-implemented techniques for improved linking of customers with suppliers in a software-as-a-service-based system based on community supplier information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The expansion of the internet has brought about a new class of centralized computing. Historically, centralized computing was implemented by mainframe computers in a time-sharing or utility computing model. More recently, application service providers (ASPs) provide businesses with the service of hosting and management of specialized business applications on the internet, with the benefit to the businesses of reducing costs through central administration and through the service provider's specialization in a particular business application.

Even more recently, an extension of the ASP centralized computing model known as "Software as a Service," or "SaaS," has emerged. SaaS differs from the ASP computing model in at least a few ways. For one, SaaS vendors typically develop and manage their own software, while ASPs primarily focus on managing and hosting third-party software. For another, many ASPs offer more traditional client-server applications, requiring installation of dedicated client software on users' personal computers. In contrast, SaaS solutions often require only an industry-standard web browser to use. Another difference is in the architecture. Most ASPs maintain separate application instances for each business served. SaaS providers, in contrast, normally utilize a multi-tenant architecture, in which the application serves multiple businesses and users, with data partitioned accordingly by data and network access controls.

There exist electronic spend management systems that help customers of suppliers manage their electronic procurement (purchasing) activities. Such e-procurement activities may include electronic generation of purchase orders for submission to suppliers. Depending on the system, such activities may also include electronically submitting purchase orders to suppliers and electronically receiving and approving payment of invoices from suppliers.

Historically, electronic spend management systems were enterprise in nature with each customer separately purchasing and maintaining their own system instance on their premises. Today, many customers use SaaS-based electronic spend management systems to conduct e-procurement activities, including for example, Coupa™ or other SaaS-based electronic spend management solutions.

One challenge customers face using SaaS-based electronic spend management systems is supplier onboarding. Supplier onboarding refers to a process by which the system is configured so that a particular customer can conduct e-procurement activities with respect to a particular supplier using the system.

Conventional supplier onboarding processes involve each customer separately providing information about their suppliers to the system. This has a number of drawbacks. First, if different customers use the same supplier, then onboarding work may be duplicated across the customers. Relatedly, because of the siloed nature of the conventional onboarding approaches, a customer may attempt to onboard a supplier with incorrect or out-of-date supplier information unaware that other customers have already successfully onboarded that supplier to the system with current and correct supplier information. For example, a customer may attempt to onboard a particular supplier using an incorrect tax identifier for the supplier where the correct tax identifier is already known to the system as a result of successful onboards of that supplier to the system by other customers.

Another issue is that a customer may not have all the supplier information needed to onboard a particular supplier to the system. In this case, the customer may have to "chase" the supplier for the information such as repeatedly sending e-mails to the supplier, which may be frustrating for the customer and annoying to the supplier. This is also inefficient, especially if another customer that has already successfully onboarded the supplier to the system has already chased the supplier for the information. Even if a customer successfully onboards a supplier, the customer may do so with sub-optimal supplier information such as for example by providing incorrect supplier information that prevents the customer from "linking" with the supplier through the system even though the customer can conduct other e-procurement activities with respect to the supplier using the system. Thus, there are a number of deficiencies of conventional supplier onboarding approaches in SaaS-based electronic spend management systems.

Computer-implemented techniques disclosed herein address these and other issues.

DETAILED DESCRIPTION

Figure 1:
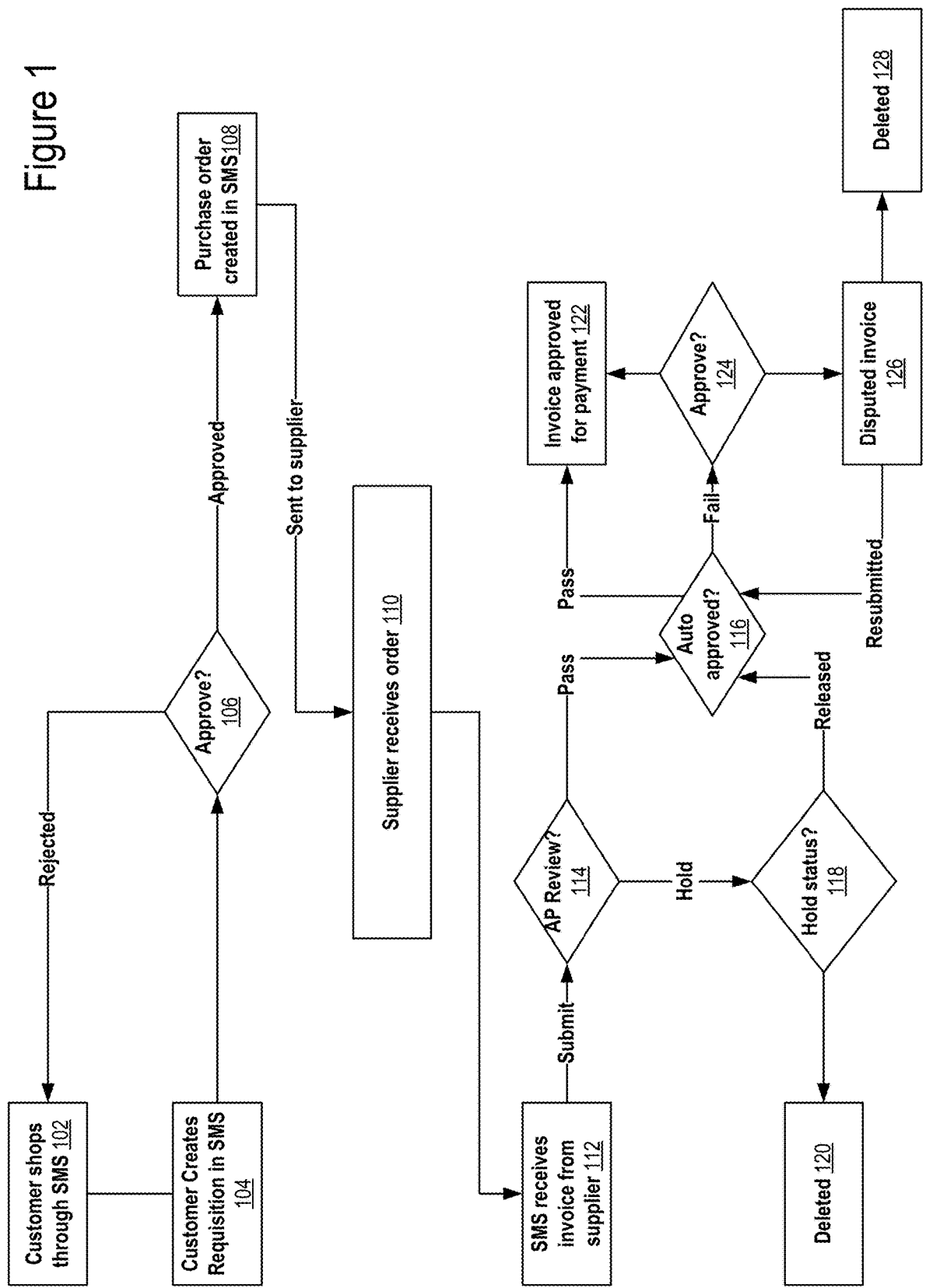
FIG. 1 depicts a flowchart of an example procure-to-pay process that may be facilitated by a software-as-service electronic spend management system when a customer and a supplier are linked through the system, according to some embodiments of the present invention.

In the following detailed description, for the purposes of explanation, numerous specific details are set forth in order to provide a thorough understanding of various embodiments of improved linking of customers with suppliers in a software-as-a-service electronic spend management system based on community supplier information. It will be apparent, however, that the embodiments may be practiced without these specific details. In other instances, well-known structures and devices are shown in block diagram form in order to avoid unnecessarily obscuring the embodiments.

General Overview

With some conventional SaaS-based spend management systems, when a customer is linked with a supplier through the system, the customer and the supplier may perform certain e-procurement activities with each other using the system that the customer and the supplier cannot perform with each other using the system when not linked. To link through the system, it is typically required that both the customer and the supplier have respective accounts with the system against which they can authenticate and perform various authorized e-procurement actives with each other using the system.

For example, when a customer and supplier are linked through a conventional SaaS-based electronic spend management system, the customer may be able to use the system to electronically submit purchase orders to the linked supplier (as opposed to merely generating purchase orders that must be submitted to the supplier out-of-band of the system). In addition, or alternatively, when a customer and supplier are linked through the system, the customer may be able to electronically receive invoices from the linked supplier through the system and possibly even configure the system to automatically approve payment of invoices received from the linked supplier under specified conditions. Likewise, the linked supplier may be able to use the system to electronically receive purchase orders from the linked customer through the system and electronically invoice the linked customer through the system.

Conventional supplier onboarding approaches for linking a customer with a supplier in a SaaS-based spend management system involve the customer sending an invitation to the supplier to create a supplier account with the system. However, even if the supplier accepts the invitation and creates an account with the system, correct and complete supplier information about the supplier, such as, for example, proper supplier contact information, may still need to be provided to complete the setup of the link between the customer and the supplier.

Conventional supplier onboard approaches require the customer or the supplier to provide the supplier information. As mentioned, the customer may provide incorrect supplier information or may have to chase the supplier for the information. Thus, conventional supplier onboarding processes of existing SaaS-based electronic spend management systems could be improved so that linking a customer with a supplier through the system is easier and less error prone.

Computer-implemented techniques disclosed herein address these and other issues.

Techniques are disclosed for improved linking of customers with suppliers in a software-as-a-service spend management system based on community supplier information. The techniques include the improved system suggesting to customers holding customer accounts with the system that the customers establish customer-supplier links between private supplier records of the customers and supplier accounts. The private supplier records may be stored with the system by customers and the customer accounts and the supplier accounts may be held with the system.

Unconventionally, the improved system makes the supplier link suggestions based on confidence matching private supplier records of the customers with community master supplier records of the suppliers. The improved system stores (creates or modifies) the community master supplier records based on private supplier records in the community of customers that are associated together by the system according to their similarity. Once the improved system matches a private supplier record of a customer to a community master supplier record for a supplier, the improved system may suggest to the customer that the customer link the matched private supplier record to a supplier account of the supplier based on the improved system identifying that the supplier account is already customer-supplier linked to at least one other customer in the community.

The techniques provide a number of improvements over conventional supplier onboarding processes.

First, a customer can receive a suggestion to link with a supplier through the improved system that the customer has onboarded to the system but is not yet linked with. The customer may receive that suggestion without knowing whether the supplier already holds a supplier account with the system, without knowing whether the supplier has already been onboarded to the system by another customer and without knowing whether the supplier has already linked through the system with another customer. Thus, the techniques make it easier for customer to use the improved system to link with suppliers by reducing the information the customer must have at hand in order to link with a supplier. Further, the techniques reduces the number of steps the customer would otherwise have to perform to link with the supplier because the customer can leverage the steps already performed by other customers in the community when onboarding and linking with the supplier.

Second, because the community master supplier record for the supplier is stored based on a community of similar private supplier records, the supplier information of the community master supplier information reflects the consensus of the community of customers with respect to the correct supplier information for that supplier. As such, the suggestion made to the customer to link with the supplier based on matching a private supplier record of the customer to the community master supplier record for the supplier is more likely to suggest the supplier intended by the private supplier record than if the private supplier record were matched directly to another private supplier record of another customer. Since the community master supplier record reflects the consensus of the community of customers with respect to a particular supplier, the community master supplier record is more likely to have the correct supplier information for the supplier than any one private supplier record for the supplier.

Third, the creation of duplicates is avoided. In particular, because of the suggestion, the customer can link with the supplier through an existing supplier account of the supplier rather than the customer inviting the supplier to create another supplier account which is a duplicate or a substantial duplicate of the existing supplier account. Thus, the suggestion conserves computing storage resources that would otherwise be consumed by the additional unnecessary supplier account.

Fourth, the community master supplier record for a supplier may contain supplier activity and/or capability information based on which a more relevant supplier linking recommendation may be made. For example, the community master supplier record for a particular supplier may indicate not just that the particular supplier has already linked with customers through the system but that the particular supplier has conducted e-procurement activities (e.g., is actively invoicing) with customers through the system. By this indication, only suppliers that are actively conducting certain designated e-procurement activities with customers of the system may be identified for a supplier link recommendation, thereby filtering out suppliers that are not actively conducting e-procurement activities with customers that are less likely to be relevant to a customer in a supplier link recommendation. In a similar way, other e-procurement activity and capability information indicated by the community master supplier record for a particular supplier such as whether the particular supplier is performing certain electronic transactions with customers using the system or is capable of conducting certain automatic transactions with customers (e.g., automatic bulk invoice loading in CSV, cXSML, or EDI formats) may be used to identify more relevant suppliers to be the subject of a supplier link recommendation, or to filter out suppliers that do not meet threshold recommendation criteria, such as, for example, actively or recently invoicing with customer using the system.

Computer-Based Implementation

An implementation of the techniques may encompass performance of a method or process by a computing system having one or more processors and storage media. The one or more processors and storage media may be provided by one or more computer systems. An example computer system is described below with respect to FIG. 7. The storage media of the computing system may store one or more computer programs. The one or more computer programs may include instructions configured to perform the method or process.

In addition, or alternatively, an implementation of the techniques may encompass instructions of one or more computer programs. The one or more computer programs may be stored on one or more non-transitory computer-readable media. The one or more stored computer programs may include instructions. The instructions may be configured for execution by a computing system having one or more processors. The one or more processors of the computing system may be provided by one or more computer systems. The computing system may or may not provide the one or more non-transitory computer-readable media storing the one or more computer programs.

In addition, or alternatively, an implementation of the techniques may encompass instructions of one or more computer programs. The one or more computer programs may be stored on storage media of a computing system. The one or more computer programs may include instructions. The instructions may be configured for execution by one or more processors of the computing system. The one or more processors and storage media of the computing system may be provided by one or more computer systems.

If an implementation encompasses multiple computer systems, the computer systems may be arranged in a distributed, parallel, clustered or other suitable multi-node computing configuration in which computer systems are continuously, periodically or intermittently interconnected by one or more data communications networks (e.g., one or more internet protocol (IP) networks.)

Users—Customer and Suppliers

Techniques disclosed herein provide suggestions to customers to link with suppliers in the improved software-as-a-service electronic spend management system based on community supplier information about the suppliers. At the outset, it is helpful to understand different users of the system. At the highest level, there are two main categories of users: customer users and supplier users.

A customer user of the system may be an agent (e.g., employee) of a customer, which is typically a business, corporation or other organizational entity, or a division, department or other sub-organizational entity thereof, that purchase goods and services (e.g., commodities) from one or more suppliers.

A supplier user of the system may be an agent of a supplier, which is typically a business, corporation or other organization entity, or a division, department or other sub-organizational entity thereof, that sells or goods and services to one or more customers. Of course, a customer of one supplier can be a supplier to another customer and, likewise, a supplier for a customer can be a customer of another supplier.

Typically, customers each have one or more customer accounts with the system against which customer users, acting as agents of a customer, can authenticate and gain access to the system to perform various authorized customer-side e-procurement functions using the system such as for example generating purchase orders for suppliers, submitting purchase orders to suppliers, receiving invoices from suppliers and approving payment of supplier invoices.

Likewise, suppliers may have supplier accounts with the system against which supplier users acting as agents of a supplier can authenticate against and perform various supplier-side e-procurement functions using the system such as for example receiving purchase orders from customers and submitting invoices to customers.

It may be a feature of the system that a customer user can use the system to conduct certain customer-side e-procurement activities with respect to a supplier without the supplier having a supplier account with the system. For example, the customer may use the system to generate purchase orders that are submitted to the supplier out-of-band of the system or the customer may use the system for other e-procurement activities such as for example spend analysis that do not require the supplier to use the system or require the supplier to hold a supplier account with the system.

Private Supplier Records

During system use, whether or not a customer is linked with a supplier, the customer user may store (create or modify) a private supplier record for the supplier in the system. The private supplier records stored in the system for a customer may enable the customer to conduct certain customer-side e-procurement activities with respect to the supplier using the system. A private supplier record contains customer-provided information about a supplier of the customer. With the system, the private supplier record may be private to that customer and not accessible by other customers using the system. For example, the private supplier record may accessible to a customer user only after successfully authenticating against a customer account held with the system that the private supplier record is associated with in the system. While a private supplier record may be associated with only one customer account held with the system, it may not be limited so and may instead by associated with multiple customer accounts held with the system such as for example when a customer holds multiple customer accounts with the system and the customer has multiple customer users using the system as its agent on its behalf.

A customer can store a private supplier record in the system in a variety of different ways and no particular way of storing private supplier records in the system is required. For example, a customer may store private supplier records in the system by bulk importing or uploading XML or cXML or other machine-readable data format of supplier information into the system. The supplier information may originate and by imported/uploaded from a third-party ERP system of the customer, for example. The SaaS-based electronic spend management system may provide a user interface or application programming interface to accomplish the bulk importing/uploading. The system may also provide a user interface (e.g., a GUI) by which a customer user can store private supplier records in the system.

A private supplier record for a supplier may contain a variety of different information about a supplier including all of the following types of supplier information, a subset of this information, or a superset thereof:
name and identity information such as for example:
  a name for the supplier,
  a Duns & Bradstreet unique identifier of the supplier, and
  a tax identifier of the supplier;
purchase order transmission information such as for example:
  how purchase orders are to be delivered to the supplier by the system,
  whether purchase order for this supplier are to be automatically held by the system for manual approval, and
  an electronic mail address of the supplier to which to send purchase orders if delivered to the supplier by electronic mail;
online store information such as for example:
  a Uniform Resource Locator (URL) of the supplier for shopping for commodities online from the supplier's website, and
  authentication credentials for accessing the supplier's website;
invoicing information such as for example:

whether the supplier is permitted to submit invoices to the customer through system via cXML and ASNs, and
whether invoices from this supplier to be automatically held by the system for accounts payable review; and
supplier contact information such as for example:
  the supplier's electronic mail address that identifies and is associated with a supplier account of the supplier held with the system, and
  a phone number for the supplier.

A private supplier record may be a data container (e.g., a file, record, entry, row, column, table, node, etc.) that contains the supplier information as values of fields (field values) of the record. Fields may also be referred to as attributes or properties.

Linked Suppliers

As indicated previously, when customers and suppliers are linked through the system, they may be able to perform various e-procurement functions without each other using the system that they otherwise would not be able to perform if not linked. As used herein, a "customer-supplier link" or just a "link," when understood in context as referring to a customer-supplier link, refers to data stored by the system that associates a private supplier record of a customer with a supplier account of a supplier. The association may be direct or indirect (transitive). For example, a direct association may be made by storing data in the system that associates an identifier of the private supplier and an identifier of the supplier account. An indirect association may be made, for example, by storing data that associates an identifier of the private supplier record with an identifier of a customer account of a customer that stored the private supplier record and storing an identifier of the customer account in association with an identifier of the supplier account. In this case, the association between the private supplier record and the supplier account is via the customer account the private supplier record and the supplier account are both associated with.

When linked, the customer and supplier may be able to use the system to conduct a complete procure-to-pay process through the system.

Procure-to-Pay Process

FIG. 1 is a flowchart of an example procure-to-pay process 100 that may be facilitated by the improved software-as-a-service electronic spend management system when a customer and a supplier are linked through the system. During performance of the process 100, a customer user and a supplier user may perform various respective steps. Performance of a step by the customer user or the supplier user may involve the user interfacing with the system from their personal computing device using a local client application (e.g., a web browser application) and a network (e.g., the internet) that connects the personal computing device to servers of the system. Such interfacing may include receiving data, media and information from the system over the network for presentation by the local client application and involve providing input, data and information from the user to the system via the local client application and the network.

At step 102, the customer user shops online through the system for commodities the customer user wishes to purchase. For example, the customer user may browse, or search, catalogs uploaded to the system by suppliers. The catalogs may have been previously uploaded or otherwise input to the system such as for example by bulk upload (e.g., in comma separated value (CSV) format) or through integration via an application programming interface with a third-party enterprise resource planning (ERP) system. Alternatively, the customer user may shop directly on a supplier's website whereby items added to an online shopping cart are sent back to the system when the customer user checks out. The transfer of purchased items from the supplier website online shopping cart back to the system may be facilitated by a protocol for communication of business documents between the website and the system such as for example commerce eXtensible Markup Language (cXML) or the like.

At step 104, the customer user uses the system to create a requisition in the system for one or more commodities that the customer user has selected for purchase at step 102.

At step 106, the requisition may be approved or rejected 106. Such approval or rejection can be automatic or manual. Automatic rejection or approval may be made by the system according to predefined configuration specified by the customer. For example, the customer may configure the system to automatically approve requisitions from certain specified customer user or for certain specified commodities. If manual, another customer user of the customer such as for example an authorized requisitions manager may manually approve or reject the requisition by providing appropriate user input to the system. If the requisition is not approved, then the customer user may return to shopping 102 and create 104 a new requisition therefrom.

If the requisition is automatically or manually approved at step 106, then, at step 108, then the system creates and stores a purchase order for the requisition. The system may then send the purchase order to the supplier. The system may send the purchase order to the supplier to in a variety of different ways and in a variety of different formats. Some of the different ways and formats that the system may send the purchase order to the supplier include by Email, by cXML, by proprietary eXtensible Markup Language (XML), by a Value-Added Network (EDI VAN), etc.

At step 110, the supplier receives the purchase order sent by the system.

Next at step 112, the system receives an invoice corresponding to the purchase order from the supplier. The system may receive the invoice from the supplier in a variety of different ways and in a variety of different formats. For example, the system may receive the invoice from the supplier by Email, by cXML, by Advance Ship Notice (ASN), etc.

At step 114, the system determines whether an accounts payable hold should be placed on the invoice. The system may make this determination according to configuration provided by the customer. For example, the customer may configure the system to place an account payable hold on all invoices, or a subset of invoices that satisfy customer-specified criteria, so that a customer user in the account payable department of the customer can use the system to review the invoice before the invoice is considered by the system for auto-approval at step 116. If the invoice is not subject to an accounts payable review at step 114, then the invoice may pass for consideration of auto-approval by the system at step 116. If the invoice is subject to an accounts payable review at step 114 and a hold is placed on the invoice by a customer user, then the invoice may remain in the hold state 118 until is the invoice is deleted 120 by a customer user or released by a customer user for consideration of auto-approval by the system at step 116.

At step 116, the system considers the invoice for auto-approval of payment. The system may make this consideration according to pre-configured criteria specified by the customer. For example, the customer may configure the system to auto-approve invoices below a specified monetary amount threshold, invoices for purchase orders submitted by specified customer users, invoices for certain specified commodities or some combination thereof.

If the invoice is auto-approved for payment by the system at step 116, then the system may automatically arrange for payment of the invoice at step 122. The system may make the payment using a variety of different payment methods including for example by the customer's net terms, the supplier's P-card, etc.

On the other hand, if the invoice is not auto-approved for payment by the system at step 116, then the invoice may wait for manual approval at step 124 by a customer user. If manually approved at step 124, then the invoice is paid by the system at step 122. If the customer user disputes 126 the invoice, then the invoice may eventually be resubmitted for auto-approval, perhaps after modifications by the supplier, or deleted 128.

The above-described procure-to-pay process is presented for purposes of illustrating a basic procurement process that may be facilitated by the software-as-a-service electronic spend management system when a customer and a supplier are linked through the system. However, the techniques disclosed herein for improved linking of customers with suppliers based on community supplier information are not limited to any particular procure-to-pay process. Instead, the techniques may be used in conjunction with a variety of different procure-to-pay processes including those with different arrangement of steps, other steps or only some of the steps depicted in FIG. 1.

Supplier Link Suggestion User Interfaces

Figure 2:
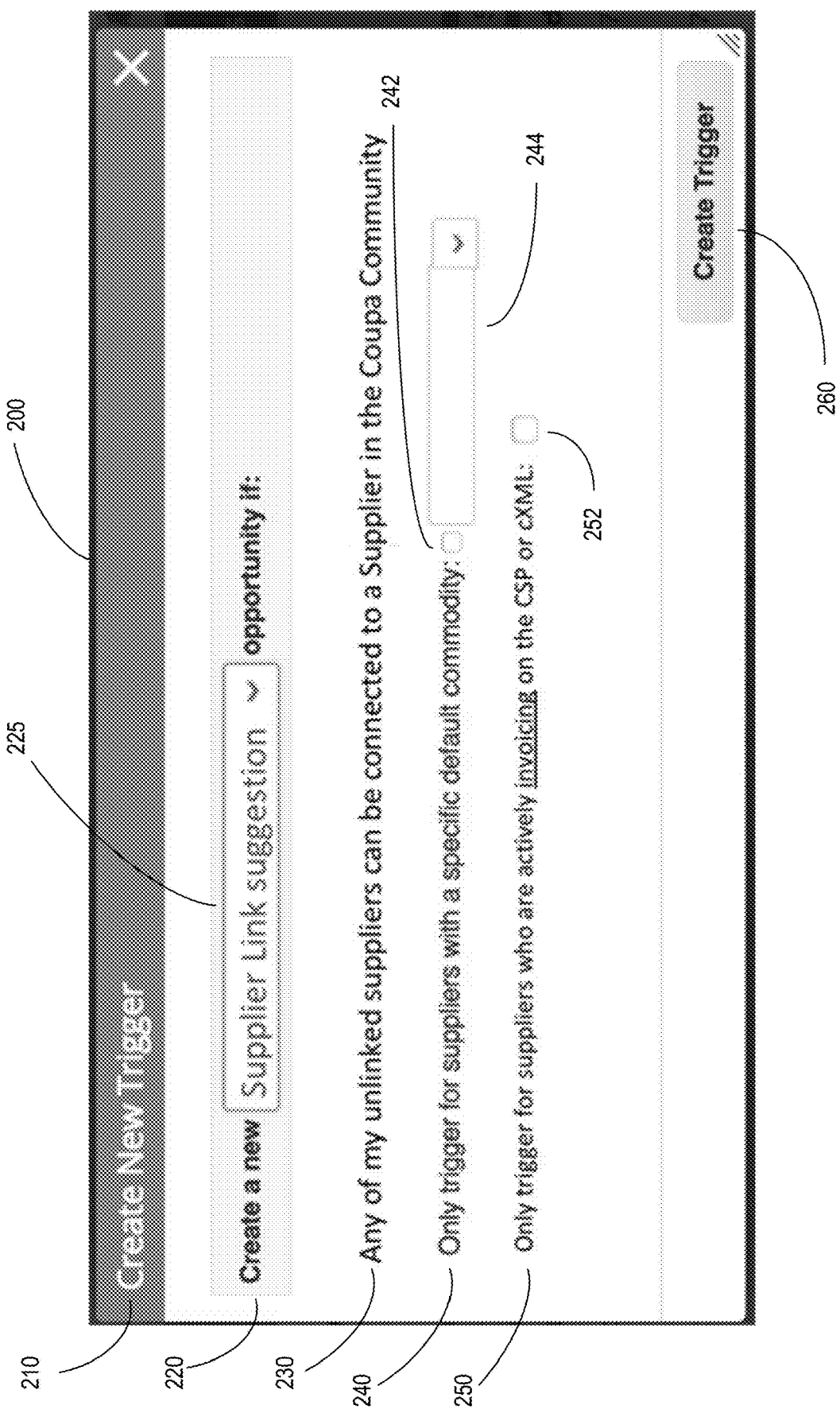
FIG. 2 depicts an example graphical user interface that enables a customer user of a software-as-a-service electronic spend management system to create a supplier link suggestion trigger, according to some embodiments of the present invention.

During system use, customer users may be presented with one or more graphical user interfaces by the system that allows them to configure whether and under what conditions they wish to receive supplier link suggestions. FIG. 2 depicts such an example graphical user interface (GUI) 200.

Using GUI 200, a customer user can create a new supplier link suggestion trigger in the system. The system may support the creation of various different types of triggers 210 including a supplier link suggestion trigger. The GUI 200 provides user interface controls 225 for selecting the type of trigger to create, in this example, a supplier link suggestion trigger. GUI 200 also includes a message 230 which describes the default configuration of the new supplier link suggestion trigger which is that any of the private supplier records associated with the customer account of the customer user that are not currently linked with a supplier account can be the subject of a supplier link suggestion. That is, for any such private supplier records, the system may suggest a supplier to link with. Message 240 is associated with user interface controls 242 (a checkbox) and controls 244 (a drop-down selection list) for limiting the suppliers suggested by the system to include only those that provide a selected default commodity. This constraint may be selected by checking the checkbox 242 and selecting the desired default commodity in the drop-down selection list 244. Message 250 is associated with user interface controls 252 (a checkbox) for limiting the suppliers suggested by the system to include only those that are configured in the system to invoice customers through an online customer portal interface (e.g., a web page) of the system or via cXML. The constraint may be selected by checking the checkbox 252. Once the customer user has selected the desired options for the new supplier link suggestion trigger, the customer user may activate the button 260 to create the trigger in the system.

Figure 3:
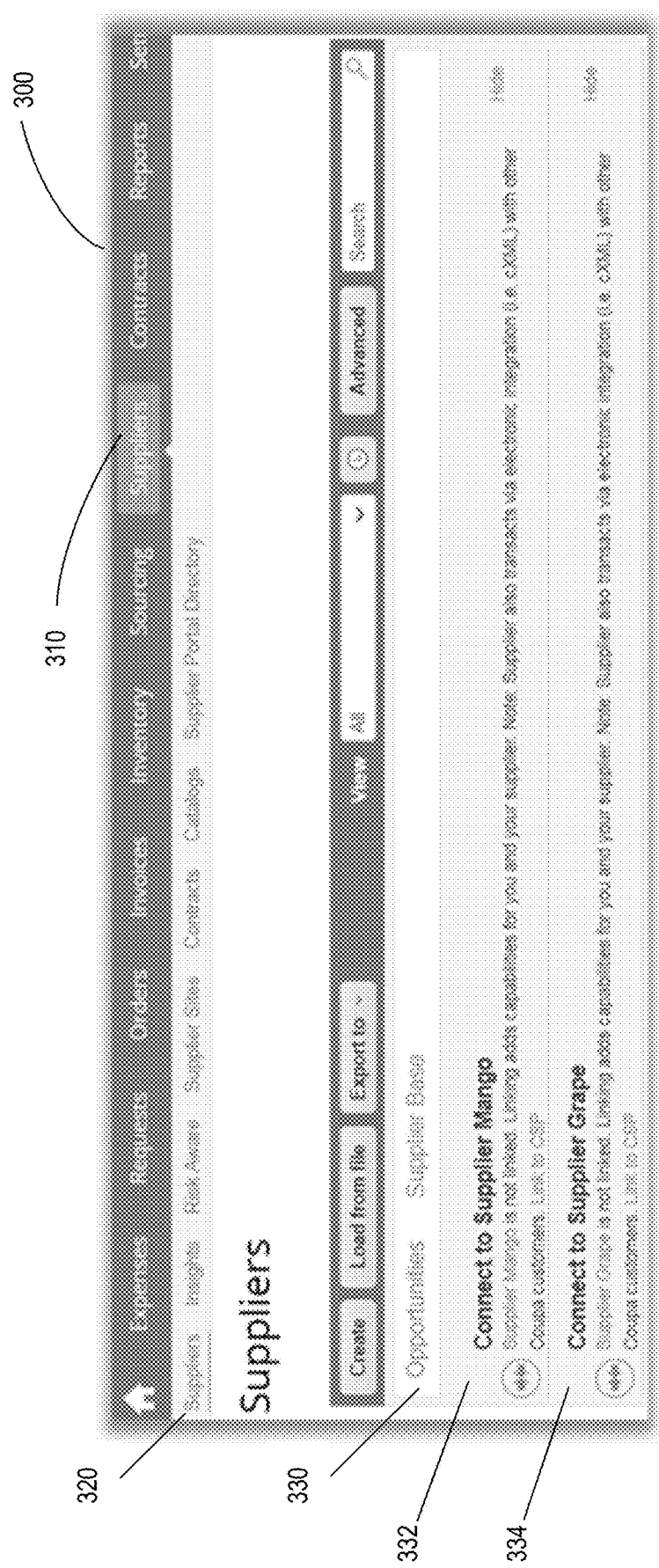
FIG. 3 depicts an example graphical user interface that suggests suppliers to link with to a customer user of a software-as-service electronic spend management system, according to some embodiments of the present invention.

After a customer user has created a supplier link suggestion trigger in the system, the customer user may receive a customer-link suggestion by the system. The suggestion may be provided to the customer user in a graphical user interface. FIG. 3 depicts an example graphical user interface 300 that may be provided by a software-as-service electronic spend management system to a customer user of the system that suggests suppliers to link with.

A customer user may be presented with GUI 300 after creating a supplier link suggestion trigger with the system such as for example via GUI 200 of FIG. 2 and after successfully authenticating against a customer account held with the system. The system may present GUI 300 to the customer user after these events and after determining one or more suggested suppliers to link with. The one or more supplier suggest may be determined according to process 500 described below with respect to FIG. 5, for example.

The GUI 300 includes a top-level customer portal navigation bar that includes a top-level selectable option 310 for "Suppliers" that is currently selected by the customer user. The top-level "Suppliers" option 310 includes a sub-level selectable option 320 for "Suppliers" that is currently selected by the customer user. With the current top-level and sub-level options 310 and 320 selected, the customer user can perform such supplier information management functions such as creating new private supplier records including loading private supplier records from a file, exporting private supplier records, viewing summaries of selected or all private supplier records and searching for private supplier records. In addition, the customer user can select an "Opportunities" option 330 (which may be selected by default when options 310 and 320 are selected).

When the Opportunities option 330 is selected, a list of one or more suggested suppliers to link with is provided. In this example, two suppliers are suggested with corresponding suggestions 332 and 334. Each suggestion 332 and 334 may correspond to a respective private supplier record associated with the customer account of the customer user that is currently not linked with a supplier account. Each suggestion 332 and 334 indicates the name of the supplier, indicates that the supplier is currently not linked with the customer, and indicates that the supplier is currently transacting with other customers in the community via cXML, electronic integration. Each suggestion 332 and 334 also provides a selectable hyperlink which the customer user can activate (e.g., click on) to initiate the process of linking the corresponding private supplier record with a supplier account of the indicated supplier. It is possible for the indicated supplier to be associated with multiple supplier accounts such as for example if the same supplier has created multiple supplier accounts with the system for different customers. As such, the process of linking the corresponding private supplier record with a supplier account of the indicated supplier may include the customer user selecting one of the multiple supplier accounts of the supplier to link the corresponding private supplier record with.

Figure 4:
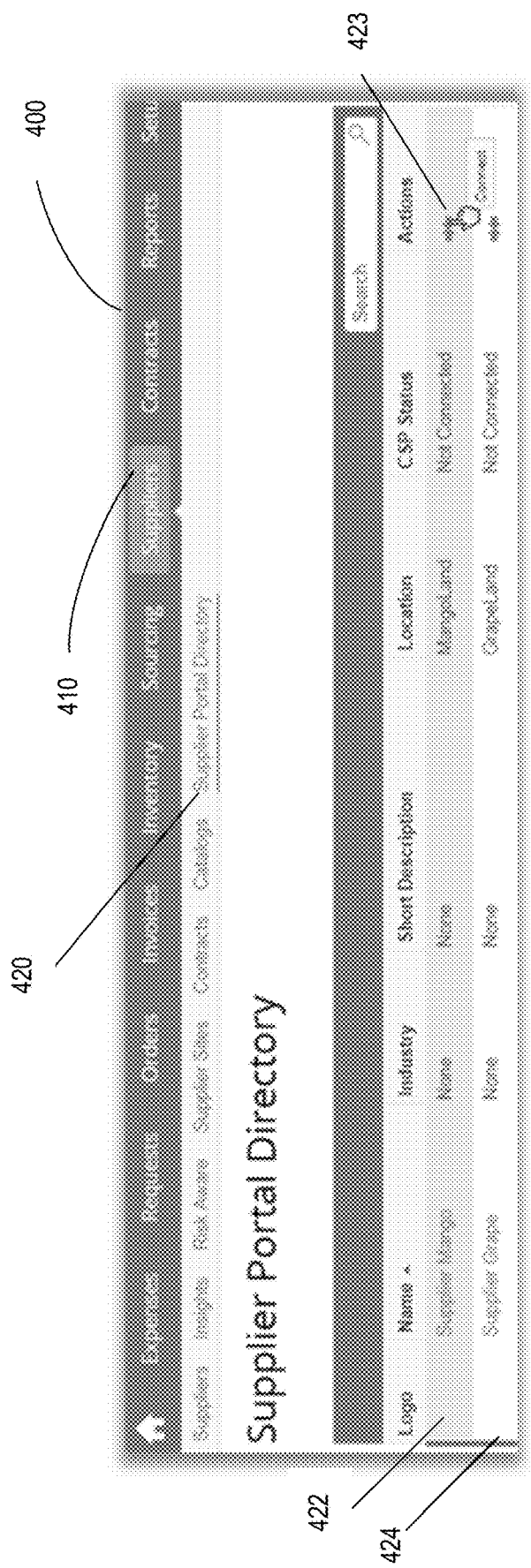
FIG. 4 depicts another example graphical user interface that intelligently suggests suppliers to link with to a customer user of a software-as-service electronic spend management system, according to some embodiments of the present invention.

FIG. 4 depicts another example graphical user interface 400 that may be provided by a software-as-service electronic spend management system to a customer user of the system that suggests suppliers to link with. In example GUI 400, selectable option 410 corresponds to top-level selectable option 310 of GUI 300 in FIG. 3. However, in the example GUI 400, the customer user has selected the "Supplier Portal Directory" sub-level option 420 instead of selecting the "Suppliers" sub-level option as in GUI 300 of FIG. 3.

When the Supplier Portal Directory option 420 is selected, a list of one or more suggested suppliers to link with is provided. In this example, two suppliers are suggested with corresponding suggestions 422 and 424. Unlike GUI 300 in which the supplier link suggestions 332 and 334 corresponding to respective private supplier records of the customer, each supplier link suggestion 422 and 424 in GUI 400 may correspond to a respective supplier account that is available to link with. Each suggestion 422 and 424 indicates the name of the supplier associated with the respective supplier account, indicates that respective supplier account is currently not linked to any of the customer's private supplier records and provides an actionable graphical user interface element (e.g., 423) to link the respective supplier account record to the private supplier record of the customer for which the respective supplier account is being suggested.

Example Supplier Link Suggestion Process

The following description presents method steps that may be implemented using processor-executable instructions, for directing operation of one or more computing devices under processor control. The processor-executable instructions may be stored on a computer-readable medium, such as a hard disk, flash memory, or the like. The processor-executable instructions may also be stored as a set of downloadable processor-executable instructions, for example, for downloading and installation from a network location.

Figure 5:
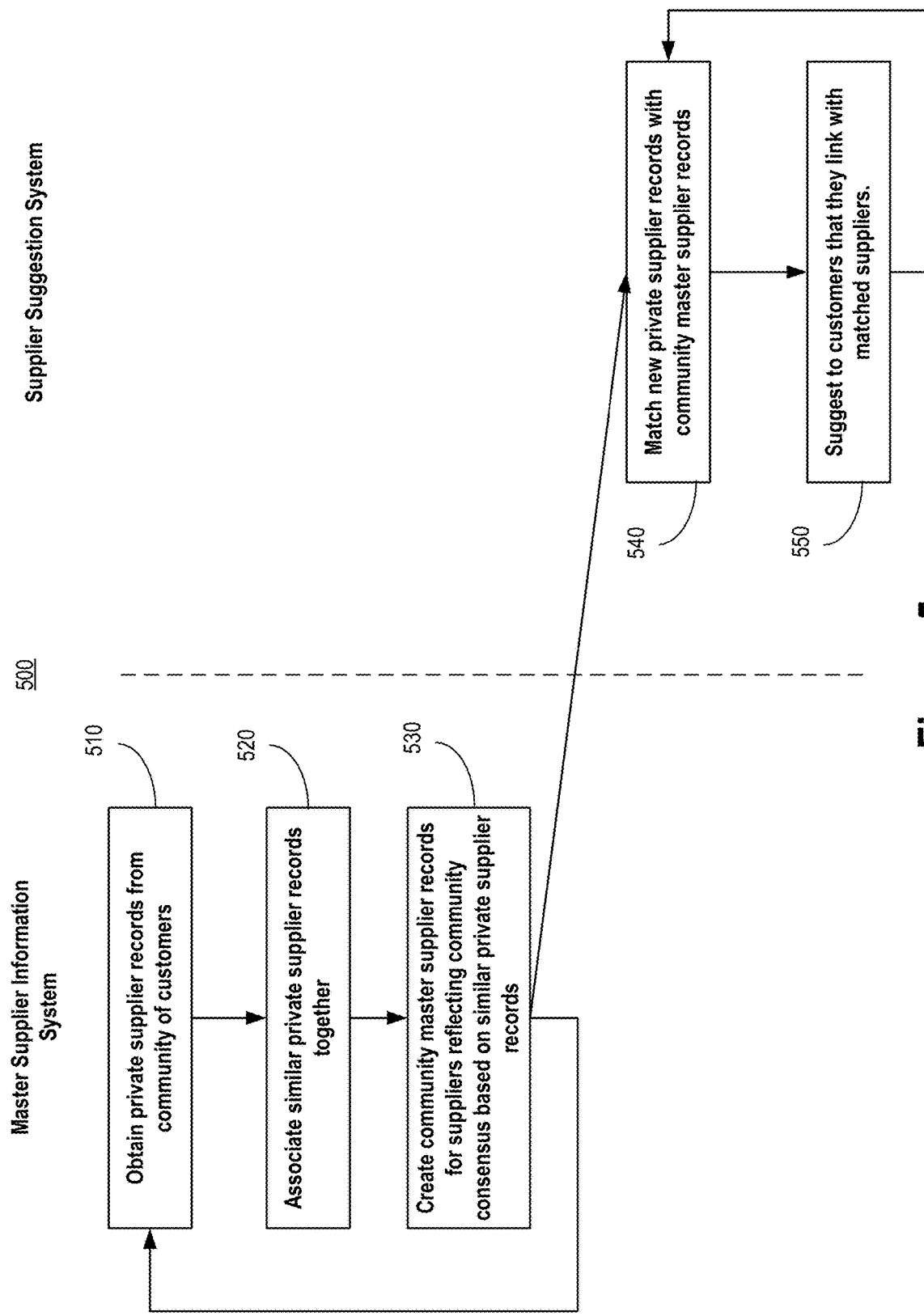
FIG. 5 depicts a flowchart of an example process for improved linking of customers with suppliers in a software-as-a-service electronic spend management system based on community supplier information, according to some embodiments of the present invention.

FIG. 5 depicts a flowchart of an example process 500 for improved linking of customers with suppliers in the improved software-as-a-service electronic spend management system based on community supplier information. A master supplier information system obtains private supplier records from a community of customers that hold accounts with the spend management system, at step 510. The community of customers may include all customers that hold customer accounts with the spend management system, or a subset thereof. The subset may exclude particular customers or particular customer accounts who do not wish to participate in the community for security or privacy reasons. In any case, the private supplier records stored by the master supplier information system may be anonymized with respect to the customer accounts they are associated with. For example, customer account identifiers can be anonymized with a one-way hash function. The master supplier information system may data warehouse private supplier records (or relevant portions thereof) associated with customer accounts in the community. As new private supplier records are created by customers, they may be added to the data warehouse such as for example by a periodic batch synchronization process. Similarly, private supplier records in the data warehouse may be updated by the batch synchronization process after customers update their master copies of the private supplier records. The result being that, at any given time, the master supplier information system may store all private supplier records (or relevant portions thereof) participating in the community minus a relatively smaller number of new or modified private supplier records that were recently created or edited by customers since a last update to the data warehouse.

At step 520, the master supplier information system associates similar private supplier records obtained 510 together into cohorts. In this context, similar includes the same (equal). Each cohort includes private supplier records that are deemed by the master supplier information system to refer to the same supplier according to similarity of field values of the private supplier records in the cohort. Various different fields of the private supplier records may be used for this associating. In general, however, fields that contain values that tend to be unique to a supplier are preferred. For example, the set of fields used for the similarity associating may include the supplier's name, the supplier's DUNS number, the supplier's tax identifier, the supplier's contact e-mail address and the supplier's contact phone number. The similarity associating may be performed with respect to just one field (e.g., supplier name) or multiple fields (e.g., supplier name and supplier tax identifier or more).

Since private supplier records are stored in the system separately by customers they may contain inconsistencies with respect to the same field. For example, three private supplier records may refer to the same supplier by different values for the supplier name field such as for example "Acme Inc." (without comma), "Acme, Inc." (with comma) and "Acme Incorporated." As such, the similarity associating may be performed based on matching field values according to a similarity measure (e.g., edit distance) and a suitable similarity threshold that must be exceed according to the similarity measure in order for the field values to be considered matching, as opposed to requiring an exact match (no dissimilarity) on field values. In addition, or alternatively, field values may be normalized (standardized) before the similarity associating is performed. For example, a statistical machine learning classifier may be trained to predict the correct field value for a given field value. For example, a statistical machine learning classifier may be trained to predict the correct supplier name given a potentially misspelled or malformed supplier name.

No particular technique for associating private supplier records together based on similarity of field values of the records is required at step 520. And any suitable technique that associates similar private supplier records together based on similarity of field values of the records into cohorts of similar private supplier records where each cohort contains private supplier records that are determined to pertain to a particular supplier may be used. The techniques may use a variety of different techniques for associating similar private supplier records together based on the field values of the records including clustering techniques and machine learning techniques according to the requirements of the particular implementation at hand. In addition, the particular technique used is not exclusive of other techniques or other bases for associated similar private supplier records together so long as the technique used is based at least on similarity of selected field values of the records.

The result of step 520 is a set of private supplier record cohorts where each cohort contains similar private supplier records that have been determined by the master supplier information system to refer to the same supplier. The set of cohorts may be regenerated entirely (i.e., a new set of cohorts) from time to time based on the current set of private supplier records obtained 510 by the master supplier information system. In between entirely regenerating the set of cohorts, a new private supplier record can be incrementally added to an existing cohort by the master suppler information system according to which cohort it is most similar.

At step 530, the master supplier information system stores (creates or updates) community master supplier records based on the private supplier records associated together in the set of cohorts. For example, the master supplier information system may store a respective community master supplier record for each cohort in the set of cohorts produced as a result of step 520. Each such community master supplier record may be store based on the private supplier records in the respective cohort. A community master supplier record reflects the consensus of the community of customers as to the correct information for a particular supplier through the customers' private supplier records that have been associated together as pertaining to that particular supplier. A community master supplier record for a supplier may contain the same fields as the private supplier records in the cohort from which the community master supplier record is generated, or a subset thereof. For example, a community master supplier record for a supplier may contain fields such as the supplier's name, the supplier's DUNS number, the supplier's tax identifier, the supplier's contact e-mail address and the supplier's contact phone number. The field values of the community master supplier records may reflect the "correct" values for those fields. For example, the field value for the supplier's name of the community master supplier record may reflect the most common supplier name among all field values for the supplier name in the private supplier records in the respective cohort.

More sophisticated techniques for determining the consensus on field values are possible. For example, the supplier name to store in the community master supplier record for a supplier may be determined by machine learning. For example, the common supplier name among the set of private supplier records in a cohort may be input to a trained statistical machine learning classifier to predict the correct supplier name. The predicted correct supplier name may then be stored in the community master supplier record for the supplier. A similar process may be employed to predict the correct field values for other fields of the community master supplier record.

No particular technique for determining the consensus of field values of private supplier records associated together in a supplier cohort is required at step 530. And any suitable technique may be used. The technique may use a variety of different techniques for determining the consensuses or "correct" field values for the community master supplier record for the supplier from the field values of the private supplier records associated together in a cohort including machine learning techniques and according to the requirements of the particular implementation at hand. In addition, the particular technique used is not exclusive of other techniques or other bases for storing the community master supplier record such as for example receiving signals (e.g., user input) from a supplier user indicating the correct field value for a supplier so long as the technique performed at step 530 is based at least on selected field values of private supplier records associated together in a supplier cohort.

Steps 510, 520 and 530 may be repeated periodically such as on a recurring basis (e.g., daily, weekly or monthly). In addition, or alternatively, steps 510, 520 and 530 may be repeated on-demand, in response to an event, such as for example when a customer created a new private supplier record.

After the master supplier system has stored community master supplier records for suppliers, a supplier suggestion system may match a newly stored private supplier with one of the community master supplier records, at step 540. For example, the supplier suggestion system may perform this step 540 in response to a customer storing a new private supplier record in the spend management system. It should be understood that the new private supplier matched to a community master supplier record in step 540 need not be one of the private supplier associated together in cohorts by the master supplier information system at step 520. Indeed, a purpose of the disclosed techniques is to be able to suggest to a customer that the customer link with a supplier they have partially onboarded but have not yet linked with. For example, the suggestion may be made just after the customer stores a new private supplier record in the spend management system.

The matching performed step 540 may be based on field values of the new private supplier record and corresponding field values of a community master supplier record. This matching performed at step 540 may be like the similarity matching performed by the master supplier information system at step 520. If the new private supplier record has over a threshold similarity with multiple community master supplier records, then the supplier suggestion system may select the community master supplier record that is closest (most similar) to the new private supplier record as the community master supplier record that the new private supplier record is matched to.

No particular technique for matching the new master supplier record to a community master supplier record is required at step 540. And any suitable technique may be used. The technique may use a variety of different techniques for matching the new private supplier record to a community master supplier record including machine learning techniques and according to the requirements of the particular implementation at hand. In addition, the particular technique used is not exclusive of other techniques or other bases for matching the new private supplier record to the a community master supplier record so long as the technique performed at step 540 is based at least on selected field values of new private supplier record and the community master supplier record.

At step 550, the supplier suggestion system suggests a supplier to link with for the new private supplier record after the new private supplier record is matched to a community master supplier record at step 540. To do this, the supplier suggestion system may identify one or more supplier accounts that are already linked to a private supplier record associated together in the cohort on which the community master supplier record was stored. There may be more than one such supplier account if for example the supplier has created different supplier accounts for different customers with private supplier records in the cohort. All such supplier accounts may be suggested to the customer to link with the new private supplier record. If there are multiple supplier accounts to suggest for the new private supplier record, they may be scored according to how similar selected field values of the new private supplier record are to selected fields of the private supplier records in the cohort associated with the multiple supplier accounts. Most similar records would receive a better (e.g., higher) score and less similar records would receive a worse (e.g., lower) score. The suggestions for the multiple supplier accounts can then be presented to the customer in score order so that the suggestions presented the multiple supplier accounts in order of relevance to the new private supplier record. The customer may then select one of the suggestions corresponding to a suggested supplier account to initiate a process for linking the new private supplier record to the selected supplier account. It is also possible to automatically link the top scoring supplier account or the only suggested supplier account to the new private supplier record with presenting a suggestion. In this case, the customer may simply receive a message after storing the new private supplier record in the system that the record has been automatically linked with a particular supplier. With this, the customer may be presented with an option to undo the automatically created link (unlink) if the customer deems the link to be incorrect or otherwise undesired.

Example Networked Computing Environment

Figure 6:
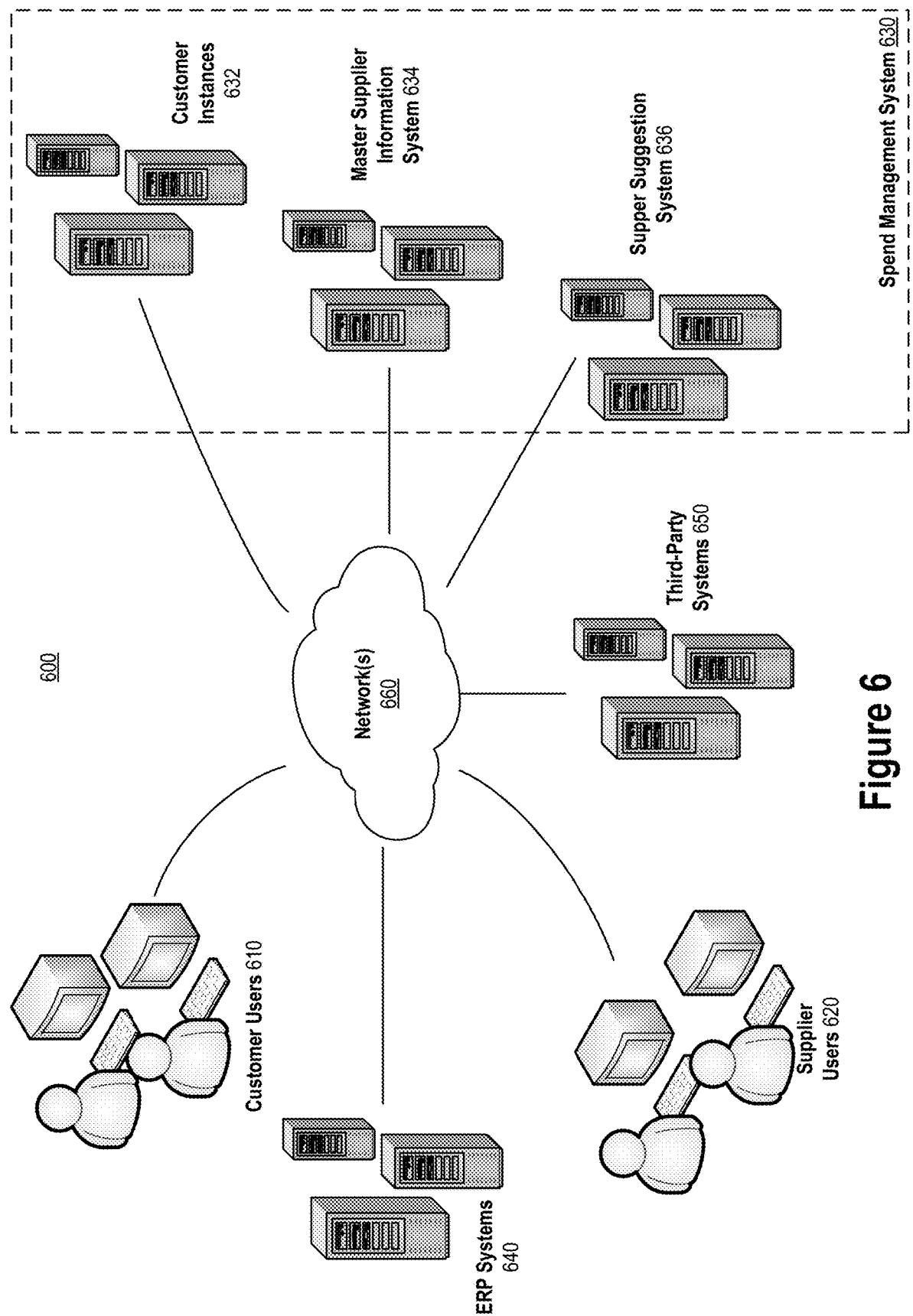
FIG. 6 depicts an example networked computing environment in which improved linking of customers with suppliers in a software-as-a-service electronic spend management system based on community supplier information may be implemented, according to some embodiments of the present invention.

FIG. 6 depicts an example networked computing environment 600 in which improved linking of customers with suppliers in the improved software-as-a-service electronic spend management system based on community supplier information may be implemented.

Environment 600 includes customer users 610 with their respective personal computer systems, enterprise resource planning (ERP) computer systems 640, supplier users 620 and their respective personal computer systems, third-party computer systems 650, network(s) 660, and software-as-a-service electronic spend management system 630 that includes customer instances 632 that may store customer private supplier records, master supplier information system 634 that may store warehouses private supplier records (or portions thereof) and community master supplier record and supplier suggestion system 636. Master supplier information system 634 and supplier suggestion system 636 may perform respective supplier link suggestion operations such as those described above with respect to FIG. 5.

Customer users 610 use their personal computers to interact with spend management system 630 over network(s) 660 according to one or more online interaction protocols. The personal computers can include desktop computers, laptop computers, tablet computers, mobile phones, or like personal computing devices. The online interaction protocol(s) may be supported by both a client application that executes at the personal computers of the customer users 610 and a server application that executes at one or more server computers that host the spend management system 630. For example, the client application and the server application may exchange data over network(s) 660 using the HTTP/S networking protocol. The data exchanged may be formatted in a variety of different ways including for example as HTML, CSS, Javascript, XML, JSON, etc. The client application may be an industry-standard web browser application or a mobile application, for example. The spend management system 630 may cause particular graphical user interfaces (e.g., web pages with particular content) to be displayed by the client applications at the personal computers of the customer users 610 by using the online interaction protocol(s) and network(s) 660 to send information to the personal computers of the customer users 610 for processing by the client applications. Customer users 610 may interact with the spend management system 630 by directing user input (e.g., keyboard, pointing device or touch input) to the graphical user interfaces, thereby causing the client applications to use the online interaction protocol(s) to send information over network(s) 660 to the spend management system 630. Supplier users 620 may likewise use their personal computers to interact with the spend management system 630 over network(s) 660 according to the online interaction protocol.

The spend management system 630 may be hosted in a public cloud. The public cloud may include computing services offered by third-party providers over the public internet (e.g., network(s) 660), making them available to anyone who wants to use or purchase them. The computing services may be sold on-demand, allowing the spend management system 630 provider to pay only per usage for the CPU cycles, storage or bandwidth consumed. Even though the provider of spend management system 630 may not also provide the public cloud computing services, the spend management system 630 provider may still be responsible for management and maintenance of the spend management system 630 within the public cloud, including putting the spend management system 630 in service on network 660.

Customers may integrate ERP systems 640 and third-party systems 650 with spend management system 630 via network(s) 660. The purpose of the integration may be to import private supplier records and associated information into spend management system 630. Such records and data imported into the spend management system 630 from ERP systems 640 and third-party systems 650 may be processed by applications of the spend management system 630 including an application that implements techniques for improved linking of customers with suppliers as disclosed herein.

The integration over network(s) 660 may be accomplished using one or more data integration protocols. One possible integration protocol is using flat files uploaded to and downloaded from a secure file transfer protocol (SFTP) server operated by the spend management system 630 provider. The flat files may be CSV files, for example, that contain private supplier records and associated information. Another possible integration protocol for importing supplier information data is using a REST API offered by servers of the spend management system 630. For example, the flat file integration protocol may be used for bulk import of supplier information, and the REST API integration protocol may be used for real-time import of supplier information including private supplier records.

Hardware Implementing Mechanism

Figure 7:
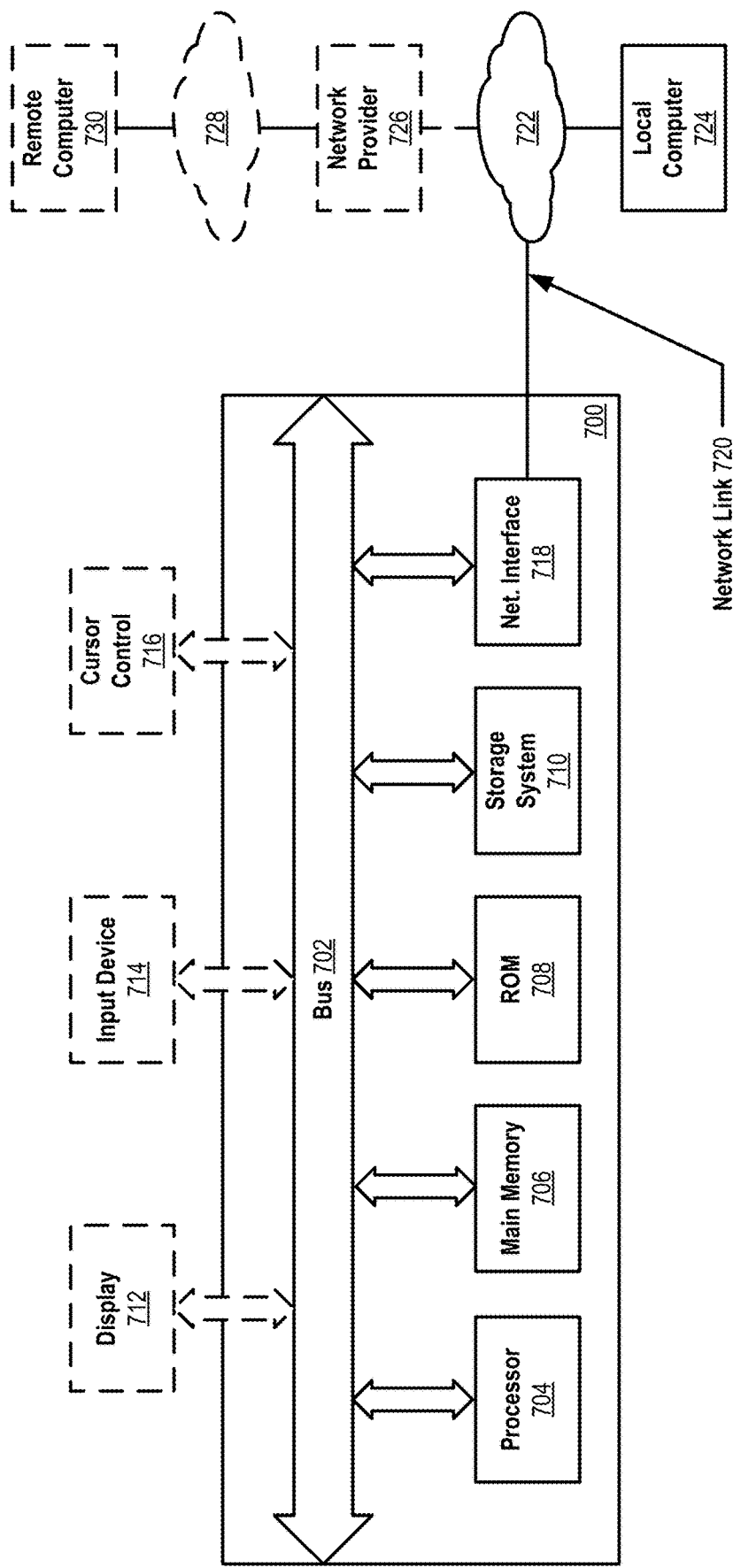
FIG. 7 depicts a computer system that may be used in an implementation of improved linking customers with suppliers in a software-as-a-service electronic spend management system based on community supplier information, according to some embodiments of the present invention.

FIG. 7 is a block diagram of a computer system 700 that may be used in an implementation of linking customers and suppliers in the improved software-as-a-service electronic spend management system based on community supplier information.

Computer system 700 includes bus 702 or other communication mechanism for communicating information, and one or more hardware processors coupled with bus 702 for processing information. Hardware processor 704 may be, for example, a general-purpose microprocessor, a central processing unit (CPU) or a core thereof, a graphics processing unit (GPU), or a system on a chip (SoC).

Computer system 700 also includes a main memory 706, typically implemented by one or more volatile memory devices, coupled to bus 702 for storing information and instructions to be executed by processor 704. Main memory 706 also may be used for storing temporary variables or other intermediate information during execution of instructions by processor 704. Computer system 700 may also include read-only memory (ROM) 708 or other static storage device coupled to bus 702 for storing static information and instructions for processor 704. A storage system 710, typically implemented by one or more non-volatile memory devices, is provided and coupled to bus 702 for storing information and instructions.

Computer system 700 may be coupled via bus 702 to display 712, such as a liquid crystal display (LCD), a light emitting diode (LED) display, or a cathode ray tube (CRT), for displaying information to a computer user. Display 712 may be combined with a touch sensitive surface to form a touch screen display. The touch sensitive surface is an input device for communicating information including direction information and command selections to processor 704 and for controlling cursor movement on display 712 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 714, including alphanumeric and other keys, may be coupled to bus 702 for communicating information and command selections to processor 704.

Another type of user input device may be cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Instructions, when stored in non-transitory storage media accessible to processor 704, such as, for example, main memory 706 or storage system 710, render computer system 700 into a special-purpose machine that is customized to perform the operations specified in the instructions. Alternatively, customized hard-wired logic, one or more ASICs or FPGAs, firmware and/or hardware logic which in combination with the computer system causes or programs computer system 700 to be a special-purpose machine.

A computer-implemented process may be performed by computer system 700 in response to processor 704 executing one or more sequences of one or more instructions contained in main memory 706. Such instructions may be read into main memory 706 from another storage medium, such as storage system 710. Execution of the sequences of instructions contained in main memory 706 causes processor 704 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 710) and/or volatile media (e.g., main memory 706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 702. Transmission media can also take the form of acoustic or light waves, such as those generated during radio-wave and infra-red data communications.

Computer system 700 also includes a network interface 718 coupled to bus 702. Network interface 718 provides a two-way data communication coupling to a wired or wireless network link 720 that is connected to a local, cellular or mobile network 722. For example, communication interface 118 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through network 722 to local computer system 724 that is also connected to network 722 or to data communication equipment operated by a network access provider 726 such as, for example, an internet service provider or a cellular network provider. Network access provider 726 in turn provides data communication connectivity to another data communications network 728 (e.g., the internet). Networks 722 and 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the networks 722 and 728, network link 720 and communication interface 718. In the internet example, a remote computer system 730 might transmit a requested code for an application program through network 728, network 722 and communication interface 718. The received code may be executed by processor 704 as it is received, and/or stored in storage device 710, or other non-volatile storage for later execution.

Glossary

The following definitions are offered for purposes of illustration, not limitation, in order to assist with understanding of the foregoing discussion.

ASN: ASN stands for advance ship notice and is a notification of pending deliveries similar to a packing list usually sent in an electronic format and is a common EDI document.

cXML: cXML stands commerce eXtensible Language and is a protocol for communication of business documents between procurement applications, electronic commerce hubs and suppliers. cXML is based on XML and provides formal XML schemas for standard business transactions, allowing computers to modify and validate business documents without prior configuration of their form or content.

EDI: EDI stands for electronic data interchange and provides through standards a technical basis for automated commercial conversations between two entities, either internal or external.

Network: A network is a group of two or more systems linked together. There are many types of computer networks, including local area networks (LANs), virtual private networks (VPNs), metropolitan area networks (MANs), campus area networks (CANs), and wide area networks (WANs) including the internet. As used herein, the term "network" refers broadly to any group of two or more computer systems or devices that are linked together from time to time (or permanently).

P-card: A P-card is also known as a purchasing card or a procurement card and is a type of commercial "card" that allows businesses to leverage existing credit card infrastructure to make electronic payments for a variety of commodities. A P-card typically correspond to a card account but may or may not correspond to an actual physical card. For example, a P-card may be a card account that a customer issues to a specific supplier and the supplier processes all of the customer's purchases from the supplier to the account.

VAN: VAN stands for value added network and refers to an online hosted service offering that acts as an intermediary facilitating EDI between business partners.

XML: XML stands for eXtensible Markup Language and is a markup language that defines a set of rules for encoding documents in a format that is both human-readable and machine readable.

EXTENSIONS AND ALTERNATIVES

In the foregoing detailed description, various embodiments of improved linking of customers with suppliers in a software-as-a-service electronic spend management system based on community supplier information have been described with reference to numerous specific details that may vary from implementation to implementation. The specification and drawings are, accordingly, to be regarded in an illustrative rather than a restrictive sense.

The invention claimed is:

1. A method, comprising:
obtaining, using a community master supplier information system, a plurality of private supplier records, wherein the community master supplier information system executes using one or more computer systems;
associating, using the community master supplier information system, the plurality of private supplier records together;
based on the associating the plurality of private supplier records together, storing, using the community master supplier information system, a community master supplier record;
matching, using a supplier suggestion system, a particular private supplier record with the community master supplier record, wherein the supplier suggestion system executes using one or more computer systems;
based on the matching the particular private supplier record to the community master supplier record, detecting, using the supplier suggestion system, a particular supplier account that is already linked with at least one private supplier record of the plurality of private supplier records that are associated together;
based on the detecting the particular supplier account that is already linked with at least one private supplier record of the plurality of private supplier records that are associated together, suggesting, in a user interface using the supplier suggestion system, that the particular private supplier record be linked with the particular supplier account; and
wherein the method is performing by a computing system having one or more processors and storage media storing one or more computer programs having instructions configured to perform the method.

2. The method of claim 1, wherein the plurality of private supplier records are each stored in a software-as-a-service electronic spend management system for a respective customer; and wherein the software-as-a-service electronic spend management system executes using one or more computer systems.

3. The method of claim 2, wherein the particular supplier account is held with the software-as-a-service electronic spend management system.

4. The method of claim 1, wherein each of the plurality of private supplier records contains fields having values representing supplier information.

5. The method of claim 1, wherein the associating the plurality of private supplier records together is based on similarity of field values of the plurality of private supplier records.

6. The method of claim 1, wherein the storing the community master supplier record is based on field values of the plurality of private supplier records that are associated together, the community master supplier record containing fields having values representing supplier information.

7. The method of claim 1, wherein the particular private supplier record contains fields having values representing supplier information; and wherein the matching is based on field values of the particular private supplier record and field values of the community master supplier record.

8. One or more non-transitory computer-readable media storing one or more programs for executing by a computing system having one or more processors, the one or more programs comprising instructions configured for:
   obtaining, using a community master supplier information system, a plurality of private supplier records, wherein the community master supplier information system executes using one or more computer systems;
   associating, using the community master supplier information system, the plurality of private supplier records together;
   based on the associating the plurality of private supplier records together, storing, using the community master supplier information system, a community master supplier record;
   matching, using a supplier suggestion system, a particular private supplier record with the community master supplier record, wherein the supplier suggestion system executes using one or more computer systems;
   based on the matching the particular private supplier record to the community master supplier record, detecting, using the supplier suggestion system, a particular supplier account that is already linked with at least one private supplier record of the plurality of private supplier records that are associated together; and
   based on the detecting the particular supplier account that is already linked with at least one private supplier record of the plurality of private supplier records that are associated together, suggesting, in a user interface using the supplier suggestion system, that the particular private supplier record be linked with the particular supplier account.

9. The one or more non-transitory computer-readable media of claim 8, wherein the plurality of private supplier records are each stored in a software-as-a-service electronic spend management system for a respective customer; and wherein the software-as-a-service electronic spend management system executes using one or more computer systems.

10. The one or more non-transitory computer-readable media of claim 9, wherein the particular supplier account is held with the software-as-a-service electronic spend management system.

11. The one or more non-transitory computer-readable media of claim 8, wherein each of the plurality of private supplier records contains fields having values representing supplier information.

12. The one or more non-transitory computer-readable media of claim 8, wherein the associating the plurality of private supplier records together is based on similarity of field values of the plurality of private supplier records.

13. The one or more non-transitory computer-readable media of claim 8, wherein the storing the community master supplier record is based on field values of the plurality of private supplier records that are associated together, the community master supplier record containing fields having values representing supplier information.

14. The one or more non-transitory computer-readable media of claim 8, wherein the particular private supplier record contains fields having values representing supplier information; and wherein the matching is based on field values of the particular private supplier record and field values of the community master supplier record.

15. A computing system, comprising:
   one or more processors;
   storage media;
   one or more programs stored in the storage media for execution by the one or more processors, the one or more programs having instructions configured for:
   obtaining, using a community master supplier information system, a plurality of private supplier records, wherein the community master supplier information system executes using one or more computer systems;
   associating, using the community master supplier information system, the plurality of private supplier records together;
   based on the associating the plurality of private supplier records together, storing, using the community master supplier information system, a community master supplier record;
   matching, using a supplier suggestion system, a particular private supplier record with the community master supplier record, wherein the supplier suggestion system executes using one or more computer systems;
   based on the matching the particular private supplier record to the community master supplier record, detecting, using the supplier suggestion system, a particular supplier account that is already linked with at least one private supplier record of the plurality of private supplier records that are associated together; and
   based on the detecting the particular supplier account that is already linked with at least one private supplier record of the plurality of private supplier records that are associated together, suggesting, in a user interface using the supplier suggestion system, that the particular private supplier record be linked with the particular supplier account.

16. The computing system of claim 15, wherein the plurality of private supplier records are each stored in a software-as-a-service electronic spend management system for a respective customer; and wherein the software-as-a-service electronic spend management system executes using one or more computer systems.

17. The computing system of claim 15, wherein each of the plurality of private supplier records contains fields having values representing supplier information.

18. The computing system of claim 15, wherein the associating the plurality of private supplier records together is based on similarity of field values of the plurality of private supplier records.

19. The computing system of claim 15, wherein the storing the community master supplier record is based on field values of the plurality of private supplier records that are associated together, the community master supplier record containing fields having values representing supplier information.

20. The computing system of claim 15, wherein the particular private supplier record contains fields having values representing supplier information; and wherein the matching is based on field values of the particular private supplier record and field values of the community master supplier record.

* * * * *